UNITED STATES PATENT OFFICE.

KARL AUGUST KÜHNE, OF DRESDEN, GERMANY, ASSIGNOR TO TITAN-GESELLSCHAFT MIT BESCHRÄNKTER HAFTUNG, OF DRESDEN, GERMANY, A CORPORATION.

PROCESS FOR THE REDUCTION OF REFRACTORY OXIDS.

No. 878,210.         Specification of Letters Patent.         Patented Feb. 4, 1908.

Application filed June 11, 1907. Serial No. 378,453.

*To all whom it may concern:*

Be it known that I, KARL AUGUST KÜHNE, a subject of the King of Saxony, German Empire, residing at Dresden, Behrischstrasse No. 11, Germany, have invented certain new and useful Improvements in a Process for the Reduction of Refractory Oxids, of which the following is a full, clear, and exact description.

In U. S. Letters Patent No. 861,129, granted to me on July 23, 1907, I have described and claimed a process for the production of such metals and metalloids as cannot be obtained in fused form by Goldschmidt's process. This object is obtained in such a manner that the oxygen compounds of the elements in question are caused to ignite with aluminium and chlorates or perchlorates.

It is found now that instead of the chlorates or perchlorates other substances may be used which easily give off the oxygen, such as super-oxids. It has been proposed before to mix barium super-oxid and aluminium powder and to start thereby reaction according to the original Goldschmidt process. The present invention differs from this known method essentially, so that it is no longer a question of starting the reaction and consequently dealing only with small quantities, but the whole mixture which is to undergo the reaction is treated with an excess of the super-oxid.

It has been further found that the separation of the whole metal in the mixture can be accomplished only when care is taken to produce a slag which is as thinly fluid as possible. The slag which is formed by the addition of the chlorates or super-oxids only, is not fluid enough to allow the whole of the metal to sink through to the bottom of the crucible, large or small parts of the reduced metal are held by the slag and are thus lost. However, if care is taken that by suitable additions as for instance fluorspar, lime and the like, the slag is made as thinly fluid as possible no metal is retained by the slag as before mentioned and the yield is consequently much better.

As super-oxids which may be used barium super-oxid lead super-oxid and sodium super-oxid may be mentioned. In the same manner persulfates, as for instance sodium persulfate may be used.

What I claim as my invention and desire to secure by Letters Patent is:—

1. The process for the reduction of refractory oxids which consists in mixing throughout the mass thereof aluminium, and a persulfate of a metal, and then igniting the mixture.

2. The process for the reduction of refractory oxids which consists in mixing throughout the mass thereof aluminium, and a persulfate of an alkali metal, and then igniting the mixture.

KARL AUGUST KÜHNE.

Witnesses:
 ULYSSES J. BYWATER
 PAUL ARRAS.